June 4, 1957 L. R. FITZSIMMONS 2,794,253
DENTAL FACE BOW AND HINGE AXIS LOCATOR
Filed Feb. 28, 1955

INVENTOR.
LLOYD R. FITZSIMMONS
BY
Buckhorn and Cheatham
ATTORNEYS

United States Patent Office 2,794,253
Patented June 4, 1957

2,794,253

DENTAL FACE BOW AND HINGE AXIS LOCATOR

Lloyd R. Fitzsimmons, Portland, Oreg.

Application February 28, 1955, Serial No. 490,943

4 Claims. (Cl. 32—20)

The present invention relates to dental apparatus and more particularly to a new and improved dental face bow and hinge axis locator.

Numerous dental instruments have been devised for locating the hinge or condyle axis of the lower jaw with respect to the position of a person's teeth. Such prior instruments have had numerous parts that are adjustable to one another, but the arrangement of the parts was such that it was difficult to make the necessary adjustments.

Accordingly, it is an object of the present invention to provide a new and improved face bow and hinge axis locator and in particular to provide a new and improved arrangement for making necessary adjustments between the parts thereof in locating the hinge axis.

It is a further object of the invention to provide an instrument of the class described having positive adjustment means for making the final adjustment in locating the hinge axis.

Still another object of the invention is to provide a hinge axis locator that is light in weight and easily manipulated to effect the necessary adjustment.

Other objects and advantages of the invention will become more apparent hereinafter.

In accordance with the illustrated embodiment of the invention, I have provided a hinge axis locating arm including a pair of telescopic extensible portions adapted to extend horizontally along the side of the patient's face with screw adjustment means provided between the portions for effecting positive extension or retraction of the arm. One of the arm portions is held in fixed position relative to the bite plate positioned in the patient's mouth and the other portion carries a condyle pin on a bar which slides vertically of such other portion with screw adjustment means being provided to effect the vertical adjustment of the bar and thus the condyle pin. A more detailed description of the invention follows with reference to the accompanying drawings wherein:

Figure 1:
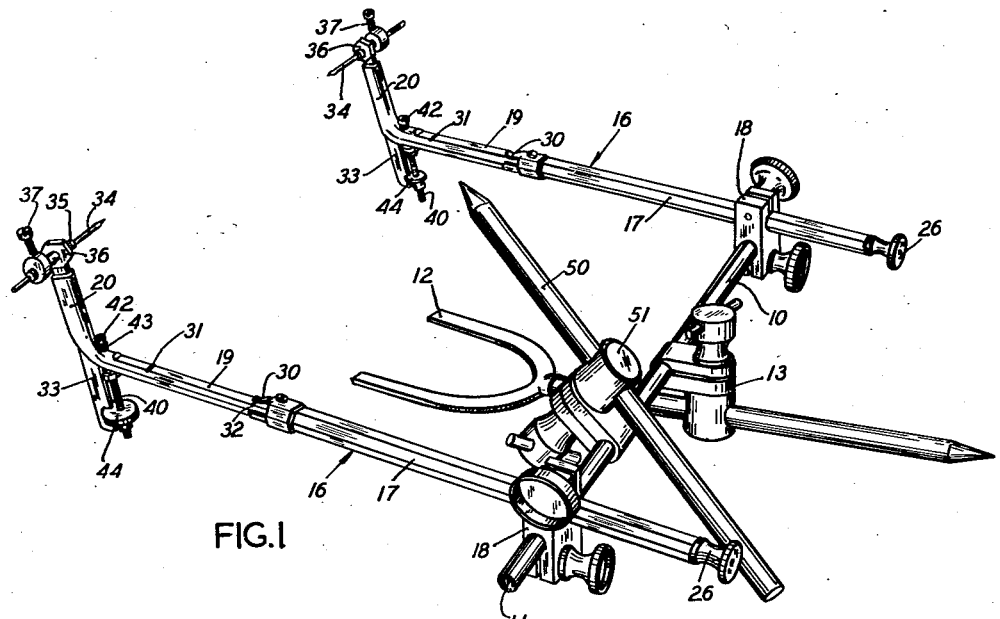
Fig. 1 is a perspective view of the instrument of the invention.

The face bow and hinge axis locator of the invention comprises a cross-bar 10 which is preferably a hollow, tubular member formed of a light weight metal, and having a plug 11 fixed in each of its opposite ends to prevent foreign matter entering the hollow center of the bar. A bite plate or mouthpiece 12 is mounted on the cross-bar by means of an adjustable clamp 13. As is known, the bite plate 12 is adapted to carry a temporary or trial plate (not shown) which is placed in the patient's mouth so that the cross-bar 10 extends transversely and horizontally of the patient's face.

Figure 2:
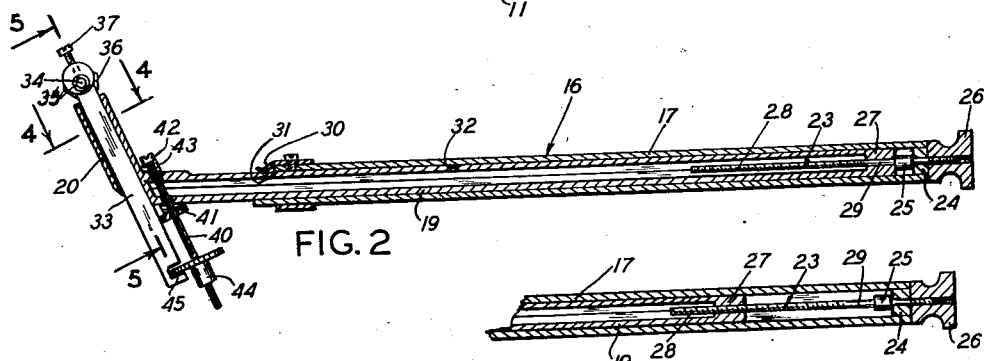
Fig. 2 is a longitudinal section of one of the hinge axis pin supporting arms.
Figure 3:
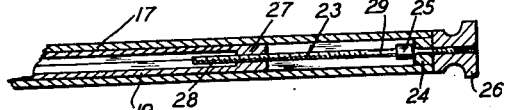
Fig. 3 is a partial, longitudinal section illustrating a detail of the adjustment mechanism of the arm of Fig. 2.

Mounted on each of the opposite ends of the cross-bar 10 is a condyle or hinge axis locating arm indicated generally by the numeral 16. The arms 16 are identical and extend rearwardly of the cross-bar 10. Each arm comprises a pair of telescopic, extensible members including, in the embodiment shown, an outer tubular sleeve 17 which is adapted to be fixedly secured with respect to the cross-bar 10 by an adjustable clamp 18. The other telescopic member of the arm comprises an elongate shank 19 slidably received within the corresponding sleeve 17, as shown in Figs. 2 and 3. Preferably the sleeve 17 and shank 19 of an arm are of hexagonal cross section, as shown, or other noncircular configuration so as to prevent rotation therebetween. The shank 19 extends out of the rearward end of the sleeve 17 and is curved upwardly at its rearward end to form a foot 20 which extends obliquely upwardly and rearwardly from the shank 19.

Means are provided for obtaining longitudinal adjustment between the sleeve 17 and shank 19 comprising an adjustment screw 23 extending inwardly of the sleeve 17 through an axial opening in its forward end defined by a flange means formed by a collar 24 pressed into the sleeve or otherwise suitably secured in the end thereof. The screw 23 is formed with an enlarged shoulder 25 adapted to engage the inner side of the collar 24 and a nut 26 is fixed by any suitable means to the outer end of the screw 23 and is adapted to engage the outer side of the collar 24 whereby the screw is secured against longitudinal movement relative to the sleeve 17. The forward end of the shank 19, that is, the end within the sleeve 17, is formed with a relatively short section 27 of reduced inner diameter and such section is internally threaded for receiving the screw 23, the end portion 28 of which is also threaded. The normal diameter of the shank 19 is such that the threaded end portion 28 of the screw 23 may rotate freely therein without engaging the walls of the shank, for a purpose to be described. Between the shoulder 25 and the threaded portion 28 thereof, the screw 23 is formed with an unthreaded neck 29 of lesser diameter than the minor diameter of the threads of the shank section 27. With reference particularly to Fig. 2, this construction is to prevent inadvertent excess tightening of the screw adjustment between the shank 19 and sleeve 17 and prevents freezing of the two parts together for if the shank 19 is drawn too far into the sleeve 17, the reduced threaded section 27 of the shank will be brought over the unthreaded neck 29 of the adjustment screw, whereby further movement of the shank 19 toward the forward end of the sleeve will be precluded and it will be impossible to freeze the parts together. To effect withdrawal of the shank 19, it is merely necessary to effect slight manual pressure on the shank to withdraw it from the sleeve 17 while rotating the screw until the threads of the screw and shank re-engage whereafter an adjustment an adjustment may be obtained by the screw 23 alone.

Further means are provided to prevent accidental excessive retraction of the shank 19 and also to prevent accidental excessive extension. Mounted on the sleeves 17 are spring clips having an arm 30 bearing against a side surface of the corresponding shank 19 formed with a pair of indentations or notches 31, 32 adapted to be engaged by the clip arm in certain longitudinal positions of the shank. The notch 31 is spaced to be engaged by the clip arm 30 just prior to the time the shank 19 is retracted to the point where the threaded shank portion 27 will run off the threads of the screw 23, so that the operator will be able to discern the position of the shank by the increased resistance to movement thereof. The shank 19 can be forced beyond this point and, for the purpose of illustration of another feature, in Fig. 2 the device is shown with the shank 19 drawn inwardly beyond the point of engagement of the notch 31 and clip arm 30. The notch 32 is positioned to be engaged by the clip arm 30 at a point just prior to complete unthreading of the screw 23 from the shank threads 27 when the shank is being extended.

Figure 5:
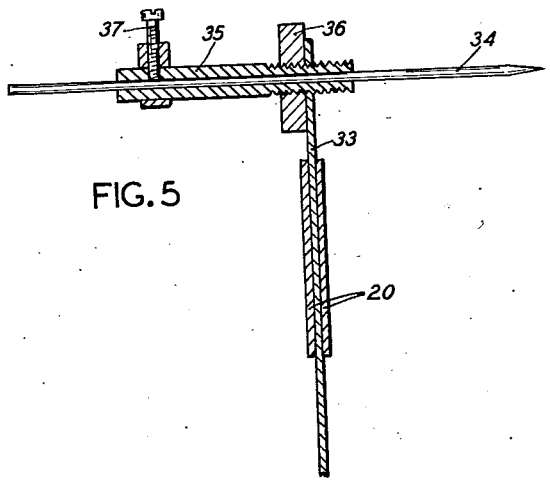
Fig. 5 is a sectional view taken along line 5—5 of Fig. 2.
Figure 4:
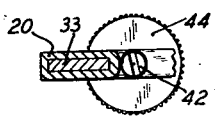
Fig. 4 is a sectional view taken along line 4—4 of Fig. 2.

The foot portion 20 is of hollow, rectangular cross section and has slidably mounted therein a condyle pin supporting bar 33 which is adapted to slide longitudinally of the foot. Mounted in the upper end of the bar 33 is a hinge axis or condyle pin 34 which is slidably supported in a sleeve 35 threadably engaged in the bar 33 and locked in position by a lock nut 36, as best shown in Fig. 5. A lock screw 37 is threaded through the sleeve 35 for locking the condyle pin 34 in position relative to the sleeve. Screw adjustment means are provided between the bar 33 and the shank 19 for elevating or lowering the bar, and thus the condyle pin 34. With reference now to Fig. 2, a screw 40 is mounted on the shank 19 adjacent the bar 33 and in parallelism with the longitudinal axis of the bar. The screw 40 passes transversely through the shank portion 19 and is fixed against rotation by means of a lock nut 41 which is drawn up on the screw to draw the head 42 thereof snugly against the shank portion. Washers 43 may be placed between the head 42 and nut 41 and the respective shank surface. Threaded on the lower end of the screw 40 is an adjusting nut 44 which engages within a slot 45 formed in the bar 33 whereby threading of the nut on the shaft 40 upwardly or downwardly causes the bar 33 to raise or lower so as to adjust the vertical position of the condyle pin 34.

An orbital plane locator 50 is also mounted on the cross-bar 10 by means of an adjustment clamp 51.

The manner of using the device is as follows: The trial plate is secured to the bite plate 12 and inserted in the patient's mouth. The arms 16 are then adjusted by use of the clamps 18 so that the condyle pins 34 are roughly in position opposite the patient's condyle axes. Thereafter the horizontal and vertical screw adjustments are utilized to bring the condyle pins 34 into exact alignment with the corresponding condyle axis. This may be done quickly and easily and adjusting one arm will not cause tremors or vibrations to disturb the setting of the other arm. The lock screws 37 are then manipulated to release the condyle pins 34 so that they may move freely in the sleeve 35. A tattooing ink is then placed on the point of each pin 34 and the pins moved into contact with the patient's face so as to tatoo the position of the axes on his face. Thereafter, orbital plane pointer 50 is adjusted to bring the point thereof into the orbital plane of the patient after which the pointer is locked in position and the device removed from the patient and placed in a conventional articulator.

As mentioned, the adjustment of the various parts may be made without causing tremors through the instrument which may upset adjustments previously made. Moreover, the screw adjustment arrangements all effect positive adjustment without the use of springs or other tension members, enabling the operator to make the adjustment smoothly and easily and with assurance that the adjustments made will not be upset by other further adjustments.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. In a dental face bow, a cross-bar and a condyle locating arm mounted thereon, said condyle arm comprising an outer tubular sleeve portion and an inner tubular portion slidably received within said sleeve portion, clamp means operatively engaging said sleeve portion and said cross-bar for adjustably securing said sleeve portion in fixed position relative to said cross-bar, and screw adjustment means for adjusting the position of said inner portion longitudinally of said sleeve portion, comprising a screw extending inwardly of one end of said sleeve portion and having an enlarged head on its outer end, said sleeve portion having an inwardly directed flange means on said one end, said head abutting against said flange means whereby to limit the movement of said screw inwardly of said sleeve portion, said screw having shoulder means thereon abutting against the inner surface of said flange whereby to limit the outward movement of said screw relative to said sleeve portion, the end of said inner tubular portion adjacent said sleeve portion one end being of reduced inner diameter for a relatively short length and being internally threaded for cooperatively engaging said screw, said screw having an unthreaded neck between said shoulder means and the threaded end portion thereof of slightly greater length than the length of the threaded portion of said inner tubular portion whereby said inner tubular portion cannot be inadvertently manipulated into locked engagement with said one end of said sleeve portion.

2. A dental face bow comprising a mouthpiece adapted to be positioned in a patient's mouth, a cross-bar secured to said mouthpiece and adapted to extend transversely of the patient's face, a condyle locating arm mounted on one end of said cross-bar and adapted to extend rearwardly of the patient adjacent one side of the patient's face, said arm including an elongate, relatively straight shank portion adapted to extend rearwardly and horizontally from said cross-bar and being curved upwardly at the rearward end thereof and defining a noncircular slide way, a slide member mounted in said slide way and extending thereabove, a condyle pin mounted in the upper end of said slide member, and screw adjustment means operatively arranged between said slide member and said arm for positive adjustment of the position of said slide member relative to said shank portion.

3. In a dental face bow, a side arm member including an elongate shank portion and an end portion extending obliquely upwardly from said shank portion, said end portion having a longitudinally extending, non-circular opening therethrough, a non-circular condyle pin supporting bar slideably mounted in said end portion opening for sliding movement longitudinally thereof, said bar extending above and below said end portion and having a slot in the lower portion thereof, a condyle pin mounted on the upper end of said bar, a screw fixedly attached to said shank portion adjacent said end portion and extending downwardly therefrom adjacent said bar in parallelism therewith, and a nut on said screw and engaging said bar slot whereby the vertical position of said condyle pin relative to said side arm member shank portion may be adjusted by means of said nut.

4. In a dental face bow, a cross bar and a condyle locating arm mounted thereon, said condyle arm comprising an outer tubular sleeve portion and an inner tubular portion slideably received within said sleeve portion, means securing said sleeve portion to said cross bar, and screw adjustment means for adjusting the position of said inner portion longitudinally of said sleeve portion, comprising a screw extending inwardly of one end of said sleeve portion, cooperative engaging means on said screw and sleeve to prevent axial movement of said screw relative to said sleeve, the end of said inner tubular portion adjacent said sleeve portion being of reduced inner diameter for a relatively short length and being internally threaded for cooperatively engaging said screw whereby rotation of said screw effects relative axial movement between said sleeve portion and said inner tubular portion.

References Cited in the file of this patent
UNITED STATES PATENTS
2,701,915  Page _____ Feb. 15, 1955